United States Patent
Ouriel et al.

(10) Patent No.: US 7,302,514 B2
(45) Date of Patent: Nov. 27, 2007

(54) DEVICE, SYSTEM, AND METHOD OF VIRTUAL MACHINE MEMORY MAPPING

(75) Inventors: Boaz Ouriel, Zichron-Yaacov (IL); Konstantin Levit-Gurevich, Kiryat Byalik (IL)

(73) Assignee: Intel Corporation, Santa Clara ( * ) Notice: Subject to any disclaimer, the term of this patent is extended or adjusted under 35 U.S.C. 154(b) by 444 days.

(21) Appl. No.: 10/866,767

(22) Filed: Jun. 15, 2004

(65) Prior Publication Data

US 2005/0289282 A1 Dec. 29, 2005

(51) Int. Cl.
*G06F 12/00* (2006.01)
(52) U.S. Cl. ............................. 711/6; 718/1
(58) Field of Classification Search .................... 711/6; 718/1
See application file for complete search history.

(56) References Cited

U.S. PATENT DOCUMENTS

| | | | |
|---|---|---|---|
| 6,789,156 B1* | 9/2004 | Waldspurger | 711/6 |
| 2004/0193394 A1 | 9/2004 | Levit-Gurevich et al. | |
| 2005/0240819 A1* | 10/2005 | Bennett et al. | 714/34 |

OTHER PUBLICATIONS

U.S. Appl. No. 10/692,948, filed Oct. 24, 2003, Levit-Gurevich et al.

* cited by examiner

*Primary Examiner*—Jack A. Lane
(74) *Attorney, Agent, or Firm*—Pearl Cohen Zedek Latzer, LLP

(57) ABSTRACT

Briefly, some embodiments of the invention may provide devices, systems and methods of memory mapping for one or more virtual machines. For example, a method in accordance with an embodiment of the invention may include mapping a memory area as a first category in relation to a first address space used by a virtual machine and as a second category in relation to a second address space used by a virtual machine monitor.

29 Claims, 3 Drawing Sheets

DEVICE, SYSTEM, AND METHOD OF VIRTUAL MACHINE MEMORY MAPPING

BACKGROUND OF THE INVENTION

In the field of computing, a processor of a computing platform may execute instructions invoked by an environment known as a Virtual Machine (VM), for example, to simulate a certain Operating System (OS) or application. Some instructions, if executed by the host processor, may cause the computing platform to become unstable, to crash, or to behave unexpectedly.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
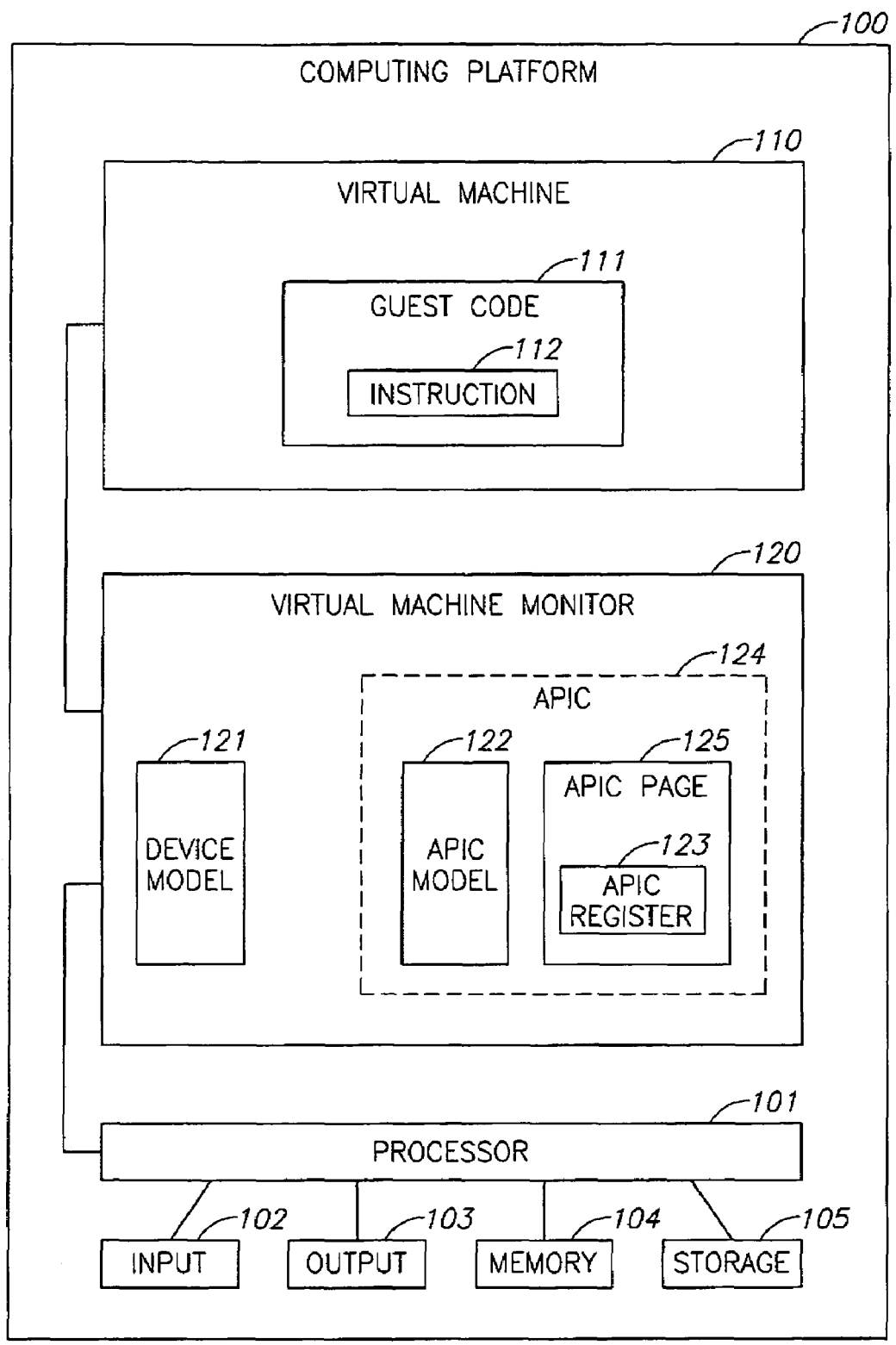
FIG. 1 is a schematic block diagram illustration of a computing platform including a Virtual Machine (VM) and a Virtual Machine Monitor (VMM) in accordance with exemplary embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

An embodiment of the invention includes an apparatus which may include a processor adapted to map a memory area as a first type in relation to a first address space used by a virtual machine and as a second type in relation to a second address space used by a virtual machine monitor. The first type may be a read-only type and the second type may be read-write. The processor may be adapted to authorize the virtual machine to read directly a content of the memory area. The processor may be adapted to avoid a virtualization work when said virtual machine attempts to read content from said memory area. The processor may be adapted to perform a virtualization work when said virtual machine attempts to write content into said memory area. The memory area may include a memory area associated with an Advanced Programmable Interrupt Controller. The processor may be adapted to set a memory breakpoint on a least a portion of said memory area. The processor may be adapted to monitor an operation of said virtual machine to detect a need for virtualization work. Another embodiment may include a computing platform which may include a virtual machine and a processor adapted to map a memory area as a first category in relation to a first address space used by said virtual machine and a as a second category in relation to a second address space used by a virtual machine monitor. The first category may be a read-only category and the second type may be read-write. The processor may be adapted to authorize said virtual machine to directly read content from said memory area. The processor may be adapted to avoid a virtualization work when said virtual machine attempts to read content from said memory area. The processor may be adapted to perform a virtualization work when said virtual machine attempts to write content into said memory area. The memory area may include a memory area associated with an Advanced Programmable Interrupt Controller. The processor may be adapted to set a memory breakpoint on at least a portion of said memory area. The processor may be adapted to monitor an operation of said virtual machine to detect a need for virtualization work. Another embodiment of the invention includes a method which may include mapping a memory area as a first type in relation to a first address space used by a virtual machine and as a second type in relation to a second address space used by a virtual machine monitor. The mapping may include mapping said memory area as a read-only type in relation to said first address space used by said virtual machine and as a read-write type in relation to said second address space used by a virtual machine monitor. The virtual machine may be authorized to directly read content from the memory area. A virtualization work may be avoided when said virtual machine attempts to read content from said memory area. The method may include performing a virtualization work when said virtual machine attempts to read content from said memory area. The mapping of said memory area may include mapping a memory area associated with an Advanced Programmable Interrupt Controller. An operation of said virtual machine may be monitored to detect a need for virtualization work. An embodiment may include a machine-readable medium having stored on it instructions that, if executed by a machine, may result in mapping a memory area as a first category in relation to a first address space used by a virtual machine and as a second category in relation to a second address space used by a virtual machine monitor. The first category may be a read-only category, and said second category may be a read-write category. The instructions, if executed by a machine, may result in avoiding a virtualization work when said virtual machine attempts to read content from said memory area. The instructions, if executed by a machine, may result in performing a virtualization work when said virtual machine attempts to write content into said memory area. The instructions that may result in mapping said memory area may result in mapping a memory area associated with an Advanced Programmable Interrupt Computer.

FIG. 1 schematically illustrates a block diagram of a computing platform 100 capable of implementing virtual machine memory mapping according to exemplary embodiments of the invention. Computing platform 100 includes a Virtual Machine (VM) 110 and a Virtual Machine Monitor (VMM) 120 in accordance with exemplary embodiments of the invention, as described in detail below. Computing platform 100 may further include, for example, a processor 101, an input unit 102, an output unit 103, a memory unit 104, and a storage unit 105. Computing platform 100 may additionally include other suitable hardware components and/or software components. In some embodiments, computing platform 100 may include or may be, for example, a personal computer, a desktop computer, a mobile computer, a laptop computer, a notebook computer, a terminal, a workstation, a server computer, a Personal Digital Assistant (PDA) device, a tablet computer, a network device, or other suitable computing device.

Processor 101 may include, for example, a Central Processing Unit (CPU), a Digital Signal Processor (DSP), a microprocessor, a host processor, a plurality of processors, a controller, a chip, a microchip, or any other suitable multi-purpose or specific processor or controller. In some embodiments, processor 101 may support and may be able to execute one or more instructions in accordance with a certain programming language or architecture, for example, virtualization architecture, e.g., Virtual Machine Extension (VMX) architecture. Processor 101 may be adapted and/or configured to perform memory mapping in accordance with some embodiments of the invention as described herein.

Input unit 102 may include, for example, a keyboard, a mouse, a touch-pad, or other suitable pointing device or input device. Output unit 103 may include, for example, a Cathode Ray Tube (CRT) monitor, a Liquid Crystal Display (LCD) monitor, or other suitable monitor or display unit.

Storage unit 105 may include, for example, a hard disk drive, a floppy disk drive, a Compact Disk (CD) drive, a CD-Recordable (CD-R) drive, or other suitable removable and/or fixed storage unit. Memory unit 104 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

VM 110 may include, for example, one or more environments able to emulate, simulate, virtualize, execute, directly execute, or invoke a hardware component, a software component, an Operating System (OS), an application, a code, a set of instructions, or the like. VM 110 may be implemented using hardware components and/or software components, for example, VM 110 may be implemented as a software application executed by processor 101, or as a hardware component integrated within processor 101. VM 110 may be able to use, directly and/or indirectly, one or more resources or components of computing platform 100, for example, processor 101 or an address space within memory unit 104. Although FIG. 1 shows a single VM 110 component, the present invention is not limited in this regard, and VM 110 may include a plurality of VMs, which, in some embodiments, may operate substantially in parallel. In some embodiments, VM 110 may simulate one or more components of a computing platform, for example, a processor able to execute instructions and/or run applications.

VM 110 may include a guest code 111, which may include, for example, one or more instructions 112 of an OS or a software application. In some embodiments, guest code 111 may be executed by processor 101, for example, using a virtual environment which may be provided by VM 110 and/or using direct execution by processor 101.

VMM 120 may include one or more software and/or hardware components able to bridge between VM 110 and processor 101 and/or vice versa. VMM 120 may be implemented using hardware components and/or software components, for example, VMM 120 may be implemented as a software application executed by processor 101, or as a hardware component integrated within processor 101. For example, VMM 120 may include one or more software and/or hardware components able to create VM 110, set and/or modify a property of VM 110, configure VM 110, monitor the operation of VM 110, and/or control the operation of VM 110. In some embodiments, VMM 120 may have, for example, system-level privileges, administrator-level privileges and/or root-level privileges, and may control the operation of VM 110 and/or other components of computing platform 100. VMM 120 may be able to use, directly and/or indirectly, one or more resources or components of computing platform 100, for example, processor 101 or an address space within memory unit 104. VMM 120 may be adapted and/or configured to perform memory mapping in accordance with some embodiments of the invention as described herein.

Although FIG. 1 shows VM 110 and/or VMM 120 as separate components of computing platform 100, the present invention is not limited is this regard, and VM 110 and/or VMM 120 may be implemented, for example, as software components stored in memory unit 104, as software components stored in storage unit 105, as controllers and/or processors and/or hardware units integrated within or coupled to processor 101, or the like.

In some embodiments, processor 101 may execute guest code 111. During the execution, for example, VM 110 may attempt to invoke execution of instruction 112 by processor 101. In some embodiments, if instruction 112 is executed by processor 101, then potentially computing platform 100 may become unstable, may crash, or may trigger an unexpected result. The attempt of VM 110 to invoke execution of instruction 112 may be referred to as a "virtualization event", and instruction 112 may be referred to as a "sensitive instruction".

In some embodiments, a virtualization event may include, for example, an attempt by VM 110 to invoke execution of a sensitive instruction which VM 110 may be unauthorized to invoke, e.g., according to pre-defined settings or privileges allocated to VM 110 by processor 101 or VMM 120. For example, a virtualization event may include an attempt by VM 110 to handle a hardware interrupt, to change a virtual address space or a page table, to directly access a certain hardware device, to directly access input unit 102, to directly access output unit 103, to access a control register of processor 101 or a control register associated with processor 101, to access a controller in computing platform 100, or an occurrence of a page fault. In some embodiments, VMM 120 may define one or more instructions as sensitive instructions, and/or may define one or more conditions to be a virtualization event. For example, VMM 120 may include a pre-defined list, table or database of instructions or sets of instructions, which, if VM 110 invokes or attempts to invoke them, may be considered a virtualization event. In some embodiments, such definitions may be defined using hardware components and/or software components.

In some embodiments, VMM 120 may be configured to detect and/or handle a virtualization event and/or a sensitive instruction. For example, VMM 120 may monitor instructions 112 of guest code 111 before they are executed by processor 101. When VMM 120 detects a virtualization event or a sensitive instruction, VMM 120 may modify the operation of computing platform 100 and/or processor 101. For example, VMM 120 may handle the sensitive instruction in accordance with a pre-defined emulation process, which may eliminate a damaging result which may result if the sensitive instructions is handled directly by processor 101.

In some embodiments, upon detection of a virtualization event or a sensitive instruction, VMM 120 may change the flow of execution of guest code 111. For example, upon detection of a sensitive instruction, VMM 120 may gain control of the flow of execution ("VM-exit"), may handle or execute the sensitive instruction using an alternate and/or emulated and/or simulated and/or indirect process ("virtualization work"), and may resume the execution of guest code 111 from an instruction subsequent to the sensitive instruction ("VM-entry"). It is noted that the term "virtualization work" as used herein may include, for example, one or more virtualization operations, virtualization tasks, virtualization jobs, virtualization processes, a portion or a part of a virtualization process, or the like.

In some embodiments, computing platform 100 may include an Advanced Programmable Interrupt Controller (APIC) 124, which may be implemented using one or more hardware and/or software components. In accordance with some embodiments of the invention, APIC 124 may include an APIC model 122 and one or more APIC registers 123. APIC model 122 may include, for example, one or more hardware and/or software components able to handle interrupts, e.g., incoming interrupts received from one or more device models 121 included in VMM 120. APIC registers 123 may include one or more memory cells or buffers which may store data used by APIC model 122 or related to the operation of APIC model 122. In some embodiments, APIC registers 123 may be part of memory unit 104. APIC model 122 may be able to write data into APIC registers 123 and/or update data stored in APIC registers 123.

In accordance with some embodiments of the invention, APIC model 122 and APIC registers 123 may be included in VMM 120. In some embodiments, VMM 120 may include other models, for example, one or more device models 121, which may communicate with APIC model 122 and may send interrupts to APIC model 122.

In some embodiments, VMM 120 may allocate APIC registers 123 using one or more memory areas, for example, an APIC page 125. In one embodiment, for example, APIC page 125 may be a part of memory unit 104. The memory allocation of APIC page 125 may be performed in relation to the number of VMs 110, for example, VMM 120 may allocate three APIC pages 125 if three VMs 110 are defined. VMM 120 may allocate a suitable memory size to accommodate APIC page 125, for example, in an exemplary embodiment, a four-kilobyte memory area may accommodate one APIC page 125.

In some embodiments, VMM 120 may map APIC page 125, or the memory area accommodating APIC page 125, in accordance with one or more pre-defined attributes, categories, criteria, types, or read-write authorizations. For example, APIC page 125 may be mapped in accordance with a first attribute, type, read-write authorization, or category in relation to a memory address space used by VM 110, and in accordance with a second, different attribute, type, read-write authorization, or category in relation to a memory address space used by VMM 120. For example, APIC page 125 may be mapped as "read" and "write" in the address space of VMM 120, such that VMM 120 may be able to read data from APIC page 125 and to write data into APIC page 125. In accordance with some embodiments of the present invention, APIC page 125 may be mapped as "read-only" in the address space of VM 110, such that VM 110 may directly read from the address space allocated to APIC page 125, but may not directly write to APIC page 125 or otherwise directly modify its content.

In some embodiments, an instruction in guest code 111 which reads directly from APIC page 125 may not be defined as a sensitive instruction. In some embodiments, an attempt by VM 110 to read directly from APIC page 125 may not be defined as a virtualization event, and may not trigger a VM-exit, a virtualization work, and a VM-entry. In accordance with some embodiments of the invention, when VM 110 invokes an operation which reads a content of APIC page 125, or otherwise accesses APIC page 125 without changing its content, a virtualization event does not occur, and it is not necessary to perform a VM-exit, a virtualization work, and a VM-entry. In some embodiments, this may significantly decrease execution time associated with handling "read" operations in which VM 110 reads from APIC page 125.

In some embodiments, an instruction in guest code 111 which writes to APIC page 125 may be defined as a sensitive operation. An attempt by VM 110 to write directly to APIC page 125 may be defined as a virtualization event, may be detected by VMM 120, and may trigger a VM-exit, a virtualization work, and a VM-entry. In some embodiments, VMM 120 may perform the virtualization work using APIC model 122. For example, VM 110 may attempt to directly write to APIC page 125, and VMM 120 may thereby detect a virtualization event. VMM 120 may thus invoke a VM-exit in which the write request is routed to and handled by APIC model 122, which may safely write data into APIC page 125. In some embodiments, for example, VMM 120 may invoke APIC model 122 to safely execute or emulate a write operation into APIC page 125, thereby updating a content of APIC page 125, e.g., a content of APIC registers 123, in accordance with the state of APIC model 122. Then, VMM 120 may invoke a VM-entry to resume the operation of VM 110 and the execution of guest code 111.

In some embodiments, VMM 120 may be configured to monitor the state of APIC registers 123 and to handle a potential modification of their content in accordance with pre-defined criteria. For example, VMM 120 may be configured to monitor the operation of VM 110 based on the assumption that a certain APIC register 123 may change its value only due to an incoming APIC signal, e.g., a write request by guest code 111 of VM 110, or when another APIC register changes its value. In one embodiments, VMM 120 may be configured to operate based on the assumption that a "read" operation performed by guest code 111 of VM 110, may not modify the content of APIC registers 123 and/or APIC page 125, and thus may not require a VM-exit, a virtualization work and/or a VM-exit.

Although some exemplary embodiments of the invention relate to APIC model 122, APIC registers 123 and APIC page 125, it would be appreciated that APIC-related components are used for exemplary purposes only. Embodiments of the invention are not limited in this regard, and may be used, for example, in conjunction with other controllers, interrupt controllers, modules, registers, buffers, pages, memory areas or models, which content or value may be determined to remain constant or substantially non-changing, and which may thus not require a VM-exit, a virtualization work and/or a VM-exit as a result of a read operation.

Figure 2:
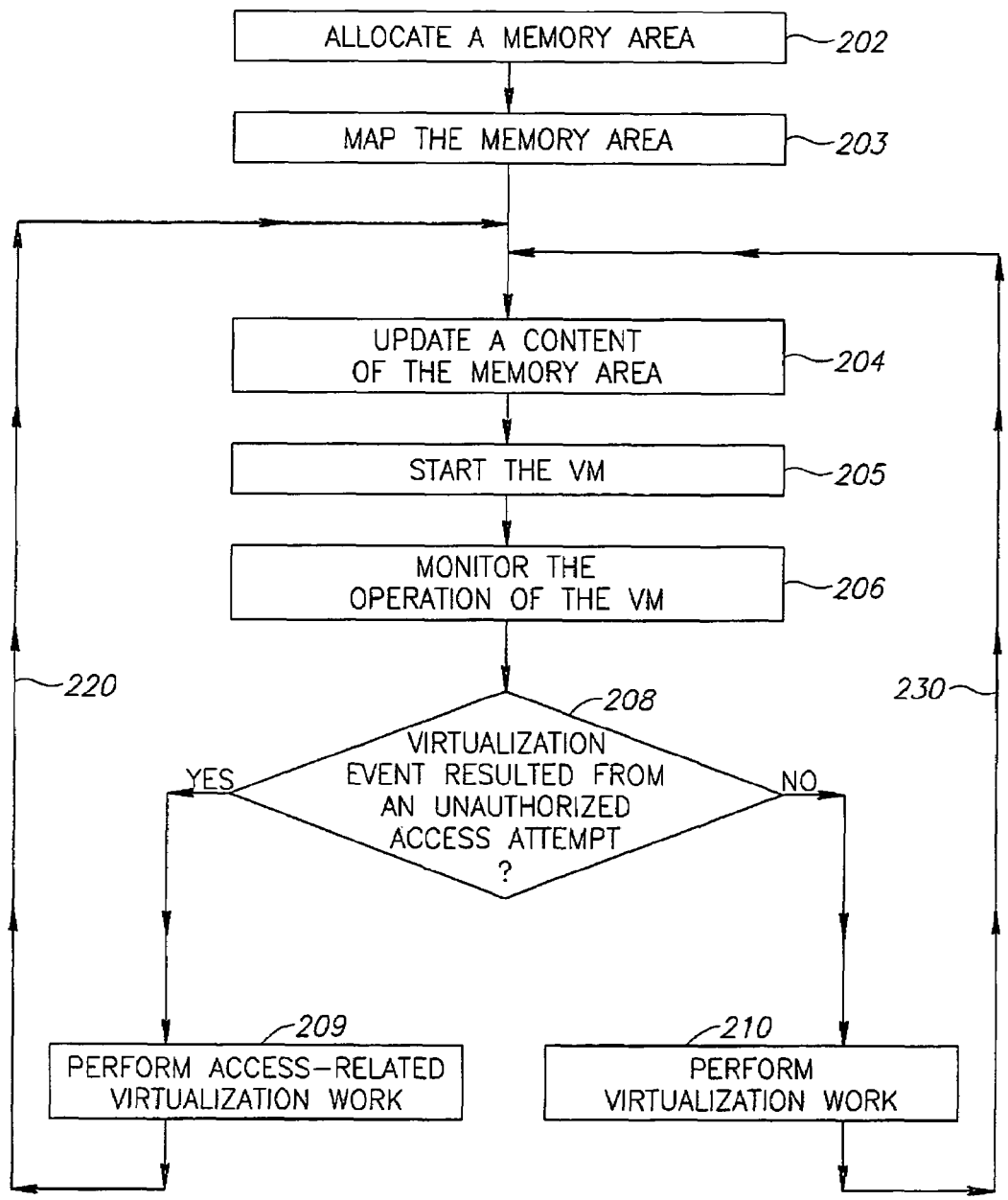
FIG. 2 is a schematic flow-chart of a method of monitoring a VM in accordance with some exemplary embodiments of the invention.

FIG. 2 is a schematic flow-chart of a method of monitoring a VM in accordance with some exemplary embodiments of the invention. The method may be used, for example, by VMM 120 to monitor VM 110, or by other suitable components, processors, controllers, monitoring units or devices to monitor the operation of one or more VMs.

Optionally, suitable preparatory operations may be performed prior to the method in accordance with some embodiments of the invention. Such preparatory operations may include, for example, creating one or more VMs, for example, VM 110 of computing platform 100. This may be performed, for example, using VMM 120.

As indicated at box 202, the method may begin by allocating a memory area, for example, to be used as one or more memory pages or registers. For example, VMM 120 may allocate a four kilobyte memory page as APIC page 125.

As indicated at box 203, the method may include mapping the allocated memory area, for example, in relation to one or more address spaces. For example, the method may include mapping a memory area as a first type in relation to a first address space used by VM 110 and as a second type in relation to a second address space used by VMM 120. For example, the method may include mapping APIC page 125 as "read-only" in an address space associated with VM 110, and/or mapping APIC page 125 as "read/write" in an address space associated with VMM 120. In some embodiments, the method may include mapping a first "read" and/or "write" privilege to a memory area in an address space associated with VM 110, and mapping a second "read" and/or "write" privilege to that memory area in an address space associated with VMM 120.

As indicated at box 204, the method may include updating a content of the memory area, e.g., a content of APIC page 125. This may be performed, for example, by VMM 120. In some embodiments, the updating may include, for example, synchronizing a memory area with a state of a model, for example, synchronizing APIC page 125 or APIC registers 123 with a state of APIC model 122.

As indicated at box 205, the method may include starting the operation of VM 110. In some embodiments, this may be performed by VMM 120, and may include, for example, resuming a suspended or paused operation of VM 110 due to a previous VM-exit.

As indicated at box 206, the method may include monitoring the operation of VM 110. This may be performed, for example, by VMM 120. In some embodiments, this may include substantially continuously monitoring the operation of VM 110 by VMM 120 until detecting a sensitive instruction or a virtualization event. The monitoring may include analyzing events and/or instructions and detecting a virtualization event, for example, a page fault or an attempt to invoke a sensitive instruction. This may be performed by VMM 120, and may include, for example, determining the sensitive instruction which caused the virtualization event, or otherwise analyzing the virtualization event or the conditions that resulted the virtualization event.

As indicated at box 208, the method may include checking whether or not the virtualization event resulted from an unauthorized attempt to access the memory area. For example, VMM 120 may check whether or not the virtualization event resulted from an unauthorized attempt by VM 110 to write into APIC page 125.

As indicated at box 209, if the virtualization event resulted from an unauthorized attempt to access the memory area, then a pre-defined virtualization work or emulation process may be performed, e.g., a virtualization work related to memory access. For example, if VM 110 attempts to write data into APIC page 125, then VMM 120 may invoke APIC model 122, thereby handling the requested access to APIC page 125. As indicated by arrow 220, the method may then proceed by performing the operations indicated at box 204 and onward, e.g., updating APIC page 125 and resuming the operation of VM 110.

In contrast, as indicated at box 210, if the virtualization event did not result from an unauthorized attempt to access the memory area, then the method may include performing a suitable virtualization work or emulation process, e.g., a virtualization work not necessarily related to memory access. As indicated by arrow 230, the method may then proceed by performing the operations indicated at box 204 and onward, e.g., updating APIC page 125 and resuming the operation of VM 110.

It is noted that a method in accordance with some exemplary embodiments of the invention may optionally include, for example, in the monitoring operations of box 206, performing one or more operations to monitor and/or handle special registers or sub-areas within the monitored memory area. For example, in one embodiment, most or substantially all APIC registers 123 may modify their values due to an incoming APIC signal or due to an access to other APIC registers 123, except for an APIC Current Count Register (APIC-CCR) which may modify its value in the course of time. A method in accordance with some embodiments of the invention may monitor and/or handle the APIC-CCR, for example, by setting one or more hardware memory breakpoints on the APIC-CCR during the mapping operation of box 203 when a linear address of the APIC-CCR may be known. This may ensure that when VM 110 attempts to read the content of the APIC-CCR, which may change over time, VMM 120 may invoke a VM-exit, a suitable virtualization work and a VM-entry in order to safely handle the read attempt. Other suitable procedures may be used to monitor and/or handle other specific registers.

Other suitable operations or sets of operations may be used in accordance with embodiments of the invention.

Figure 3:
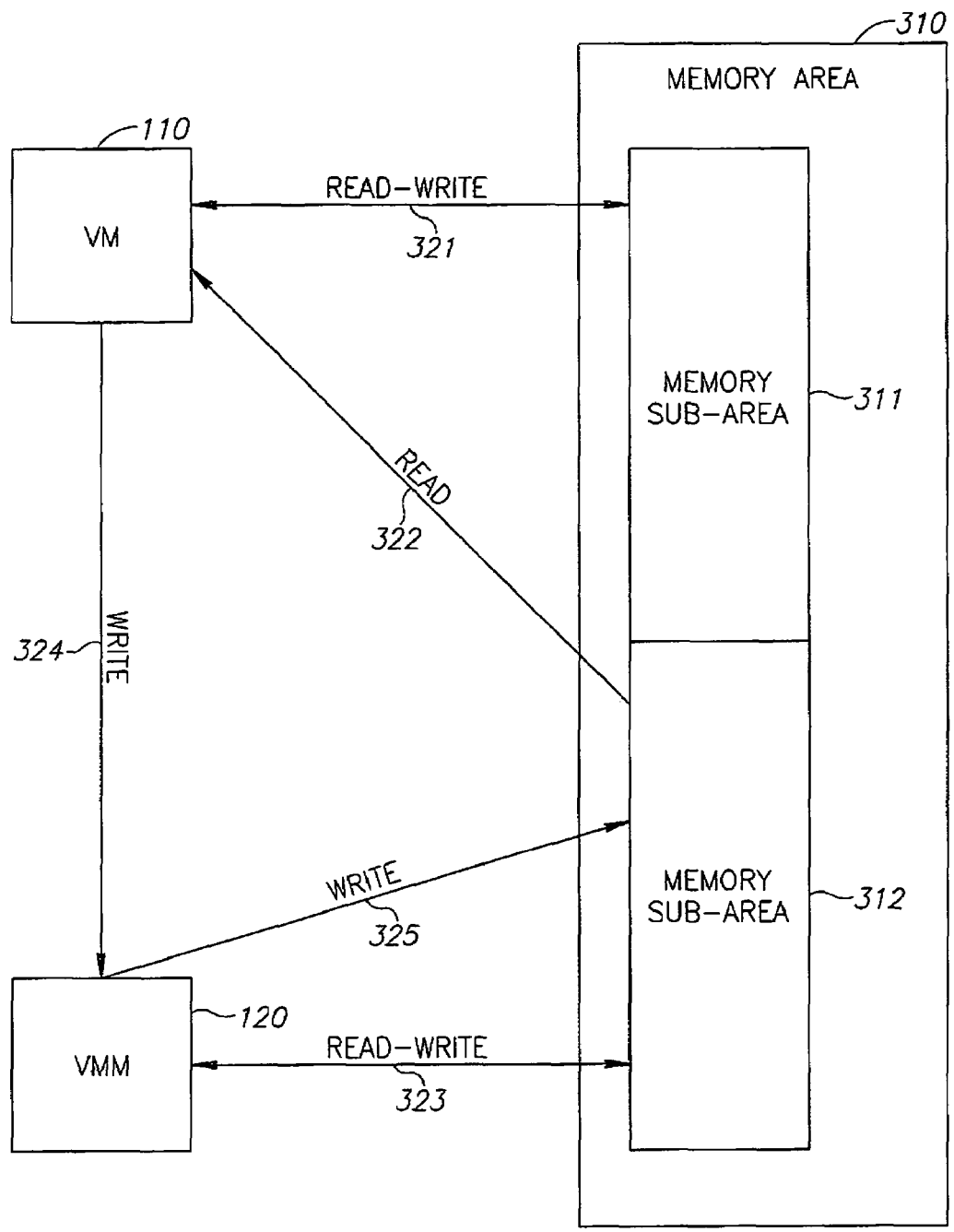
FIG. 3 is a schematic block diagram illustration of memory mapping and access authorizations in accordance with some exemplary embodiments of the invention.

FIG. 3 schematically illustrates a block diagram of memory mapping and access authorizations in accordance with some exemplary embodiments of the invention. The block diagram of FIG. 3 may represent, for example, memory mapping and access authorization associated with computing platform 100 of FIG. 1 or resulting from performing the operations of the method of FIG. 2.

Memory area 310 may include a memory portion, for example, a portion of memory stored in memory unit 104. Memory area 310 may include one or more memory address spaces, for example, a first memory address space used by VM 110 and a second memory address space used by VMM 120. In one embodiment, for example, memory area 310 may include two memory sub-areas, for example, memory sub-area 311 and memory sub-area 312. Memory area 310 may be defined as accessible in an address space used by VM 110, and may be defined as accessible in an address space used by VMM 120.

As indicated by arrow 321, VM 110 may have read-write access authorization in relation to memory sub-area 311, e.g., VM 110 may be authorized to directly read a content stored in memory sub-area 311 and may be authorized to directly write a content into memory sub-area 311. As indicated by arrow 322, VM 110 may have a read-only access authorization in relation to memory sub-area 312, e.g., VM 110 may be authorized to directly read a content stored in memory sub-area 312 and may not be authorized to directly write a content into memory sub-area 312.

As indicated by arrows 323 and 324, when VM 110 needs to write a content into memory sub-area 312, the write operation may be performed indirectly by VMM 120. As indicated by arrow 323, VMM 120 may have a read-write access authorization in relation to memory sub-area 312, e.g., VMM 120 may be authorized to directly read a content stored in memory sub-area 312 and may be authorized to directly write a content into memory sub-area 312. Therefore, VMM 120 may be used to write, on behalf of VM 110, a content into memory sub-area 312. It is noted that VMM 120 may have a read-write access authorization in relation to sub-area 311.

Although FIG. 3 schematically illustrates, for exemplary purposes, read-write authorizations in relation to memory areas, embodiments of the present invention are not limited in this regard and may be used in conjunction with various other suitable memory attributes, file attributes, system attributes, component attributes, memory types, file types, system types, component types, memory categories, file categories, system categories, component categories, or the like.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by computing platform 100, by processor 101, by a processor or controller adapted or configured to perform memory mapping in accordance with some embodiments, by VMM 120 or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 104), memory device, memory article, memory medium, storage device, storage article, storage medium and/or storage unit (e.g., storage unit 105), for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a processor adapted to map a memory area as a first type in relation to a first address space used by a virtual machine and to map the memory area as a second type in relation to a second address space used by a virtual machine monitor.

2. The apparatus of claim 1, wherein said first type is a read-only type and said second type is a read-write type.

3. The apparatus of claim 1, wherein said processor is adapted to authorize said virtual machine to directly read a content of said memory area.

4. The apparatus of claim 1, wherein said processor is adapted to avoid a virtualization work when said virtual machine attempts to read content from said memory area.

5. The apparatus of claim 1, wherein said processor is adapted to perform a virtualization work when said virtual machine attempts to write content into said memory area.

6. The apparatus of claim 1, wherein said memory area comprises a memory area associated with an Advanced Programmable Interrupt Controller.

7. The apparatus of claim 1, wherein said processor is adapted to set a memory breakpoint on at least a portion of said memory area.

8. The apparatus of claim 1, wherein said processor is adapted to monitor an operation of said virtual machine to detect a need for a virtualization work.

9. A computing platform comprising:
   a virtual machine; and
   a processor adapted to map a memory area as a first category in relation to a first address space used by said virtual machine and to map the memory area as a second category in relation to a second address space used by a virtual machine monitor.

10. The computing platform of claim 9, wherein said first category is a read-only category and said second category is a read-write category.

11. The computing platform of claim 9, wherein said processor is adapted to authorize said virtual machine to directly read content from said memory area.

12. The computing platform of claim 9, wherein said processor is adapted to avoid a virtualization work when said virtual machine attempts to read content from said memory area.

13. The computing platform of claim 9, wherein said processor is adapted to perform a virtualization work when said virtual machine attempts to write content into said memory area.

14. The computing platform of claim 9, wherein said memory area comprises a memory area associated with an Advanced Programmable Interrupt Controller.

15. The computing platform of claim 9, wherein said processor is adapted to set a memory breakpoint on at least a portion of said memory area.

16. The computing platform of claim 9, wherein said processor is adapted to monitor an operation of said virtual machine to detect a need for a virtualization work.

17. The computing platform of claim 9, comprising a Dynamic Random Access Memory.

18. A method comprising:
    mapping a memory area as a first type in relation to a first address space used by a virtual machine and mapping the memory area as a second type in relation to a second address space used by a virtual machine monitor.

19. The method of claim 18, wherein said mapping comprises mapping said memory area as a read-only type in relation to said first address space used by said virtual machine and as a read-write type in relation to said second address space used by said virtual machine monitor.

20. The method of claim 18, comprising authorizing said virtual machine to directly read content from said memory area.

21. The method of claim 18, comprising avoiding a virtualization work when said virtual machine attempts to read content from said memory area.

22. The method of claim 18, comprising performing a virtualization work when said virtual machine attempts to write content into said memory area.

23. The method of claim 18, wherein mapping said memory area comprises mapping a memory area associated with an Advanced Programmable Interrupt Controller.

24. The method of claim 18, further comprising monitoring an operation of said virtual machine to detect a need for a virtualization work.

25. A machine-readable medium having stored thereon instructions that, if executed by a machine, result in:

mapping a memory area as a first category in relation to a first address space used by a virtual machine and mapping the memory area as a second category in relation to a second address space used by a virtual machine monitor.

26. The machine-readable medium of claim 25, wherein said first category is a read-only category and said second category is a read-write category.

27. The machine-readable medium of claim 25, wherein said instructions, if executed by a machine, result in:

avoiding a virtualization work when said virtual machine attempts to read content from said memory area.

28. The machine-readable medium of claim 25, wherein said instructions, if executed by a machine, result in:

performing a virtualization work when said virtual machine attempts to write content into said memory area.

29. The machine-readable medium of claim 25, wherein the instructions that result in mapping said memory area result in mapping a memory area associated with an Advanced Programmable Interrupt Controller.

* * * * *